(12) United States Patent
Hilgers (10) Patent No.: US 8,207,676 B2
(45) Date of Patent: Jun. 26, 2012

(54) AMBIENT LIGHT COMPENSATION SENSOR AND PROCEDURE

(75) Inventor: Achim Hilgers, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 12/676,629

(22) PCT Filed: Sep. 8, 2008

(86) PCT No.: PCT/IB2008/053623
§ 371 (c)(1),
(2), (4) Date: Mar. 5, 2010

(87) PCT Pub. No.: WO2009/034515
PCT Pub. Date: Mar. 19, 2009

(65) Prior Publication Data
US 2010/0308737 A1 Dec. 9, 2010

(30) Foreign Application Priority Data
Sep. 11, 2007 (EP) .................................. 07116096

(51) Int. Cl.
*H05B 37/02* (2006.01)
*H05B 41/24* (2006.01)

(52) U.S. Cl. ........................................ 315/152; 315/149

(58) Field of Classification Search .................. 315/149, 315/50, 151, 152, 153, 154, 155, 156, 157, 315/158; 250/200, 203.3, 201.1, 203.2, 205, 250/552, 553; 362/800
See application file for complete search history.

(56) References Cited

U.S. PATENT DOCUMENTS

| | | | |
|---|---|---|---|
| 4,550,254 A | 10/1985 | Zomorrodi et al. | |
| 5,844,680 A * | 12/1998 | Sperling | 356/303 |
| 6,122,042 A * | 9/2000 | Wunderman et al. | 356/73 |
| 6,337,541 B1 * | 1/2002 | Dickie et al. | 315/169.3 |
| 6,495,964 B1 * | 12/2002 | Muthu et al. | 315/149 |
| 6,507,159 B2 * | 1/2003 | Muthu | 315/307 |
| 6,674,060 B2 * | 1/2004 | Antila | 250/205 |
| 7,110,062 B1 * | 9/2006 | Whitted et al. | 349/68 |
| 7,446,303 B2 * | 11/2008 | Maniam et al. | 250/226 |
| 2006/0146330 A1 | 7/2006 | Maniam | |
| 2006/0152725 A1 | 7/2006 | Peterson et al. | |
| 2006/0164716 A1 * | 7/2006 | Leplingard et al. | 359/334 |
| 2007/0090276 A1 | 4/2007 | Peng et al. | |

FOREIGN PATENT DOCUMENTS

| | | |
|---|---|---|
| EP | 1988752 A1 | 11/2008 |
| WO | 02082403 A1 | 10/2002 |

(Continued)

*Primary Examiner* — Douglas W Owens
*Assistant Examiner* — Minh D A
(74) *Attorney, Agent, or Firm* — Mark L. Beloborodov (57) ABSTRACT

The present invention relates to a solid-state based light source, a corresponding circuitry and a method of emitting light, including one or more light source elements for generating light, a first sensor for receiving light emitted by the light source elements and ambient light and for generating a first sensor signal (S1) representing the received light, a second sensor for only receiving ambient light and for generating a second sensor signal (S2) representing the received ambient light. Moreover, the solid-state based light source comprises a control unit for receiving the first and the second sensor signals (S1, S2) and for generating control signals (Sc) for controlling the light source elements, based on the difference between the first and the second sensor signals (S1, S2), to compensate for the influence of the ambient light.

12 Claims, 6 Drawing Sheets

FOREIGN PATENT DOCUMENTS

| | | |
|---|---|---|
| WO | 2005026610 A1 | 3/2005 |
| WO | 2007007238 A1 | 1/2007 |
| WO | 2007027854 A2 | 3/2007 |
| WO | 2007099860 A1 | 9/2007 |

\* cited by examiner

AMBIENT LIGHT COMPENSATION SENSOR AND PROCEDURE

CROSS-REFERENCE TO RELATED APPLICATIONS

This application is a national stage application under 35 U.S.C. §371 of International Application No. PCT/IB2008/053623 filed on Sep. 8, 2008, and published in the English language as International Publication No. WO/2009/034515, which claims priority to European Application No. 07116096.4, filed on Sep. 11, 2007, incorporated herein by reference.

FIELD OF THE INVENTION

The present invention relates to a solid-state based light source for emitting light, which is provided with means to compensate for the influence of ambient light. Furthermore, the present invention relates to a corresponding circuitry and method.

BACKGROUND OF THE INVENTION

Light sources are going to change in such a manner that conventional lighting devices (e.g. signal lights, lamps etc.) and systems will be more and more equipped with LED-based light sources (LED: light emitting diodes). The main advantages of these LED light sources are their considerably higher efficiency and their increased lifetime. Because of the very small LED-dimensions and their flexible form factors, novel and interesting opportunities are offered to lamp designers.

Very often combinations of multiple LEDs (connected in series and/or in parallel) are used to increase the light output and hence to realize physically bigger, high-brightness lighting devices such as typically e.g. traffic lights. Also in the automotive area LED-based lighting devices are increasingly implemented.

Additional fields in which LED-based light sources can beneficially be employed are professional lighting applications (e.g. construction areas) as well as consumer applications (e.g. atmosphere lighting at home). Especially in these applications the requirements imposed on the light sources are high. In particular a very good color quality (e.g. color rendering) is required. Further it would be of additional interest to adapt the color itself (and/or the color temperature) of such an LED light source according to the user's demands. All this requires especially tailored electronic driving circuitries to the LED light sources.

Usually, white light is generated by means of a combination of a few different LEDs (of different colors). In principle the mix of these different colors is used to generate the desired white light (or also any other color) with the demanded characteristic. Very often red (R), green (G) and blue (B) LEDs are used. More colors such as e.g. amber (A) can be added to improve the color quality. Other color combinations can be used as well. By means of such combinations the light output (luminous flux) and the color temperature of the white light can be adjusted. Other colors can be generated by selectively combining the light generated by the available LEDs by means of electronic driving signals.

However, these possibilities require very specialized electronic driving circuits for each (or combinations) of the LEDs of such light sources. In addition, a sensor-based feedback loop (control) may be implemented in order to measure the light characteristic and to adjust the light output according to the desired properties. Conventional photosensitive devices such as e.g. light sensors (measuring the luminous flux) or (true) color sensors (measuring the light spectrum) can be employed to measure the light characteristics. Further sensors such as temperature sensing devices can be added. All sensed data will be used to feed the control circuitry of the lighting device, which will adjust the driving currents of the LEDs independently as long as the required light characteristic has been reached. The electronic driving currents of the LEDs can be modified in a large variety of basic circuits, which are state of the art. By way of example, pulse width modulation (PWM), amplitude modulation (AM) as well as direct current feeding should be mentioned.

Often, color control principles are based on color feedback loops in which color sensors are used to measure the actual light (spectrum, color). According to the sensor signal(s), the output of a solid-state based light source can be adjusted and adapted towards the required setting(s). Since the color sensors do not only recognize the radiated spectrum of the related light source (which will be controlled) but also the spectra of other interference sources (ambient light), special set-ups and/or procedures have to be used to compensate for this.

US 2006/0152725A1 discloses an LED-based measurement instrument including an illumination system and a sensing system for compensating for the contribution of ambient light. The illumination system includes modulated LEDs whereas the sensing system includes a photodiode, a transimpedance amplifier, and an integrator for the first stage to compensate for the effect of ambient light on the output side of the first stage. The components are expensive and a complex control circuit has to be implemented, which renders the device expensive.

SUMMARY OF THE INVENTION

It is an object of the present invention to overcome the disadvantages described above and to provide a solid-state based light source having means for compensating for the influence of ambient light that are simple, inexpensive and easy to assemble.

The present invention achieves this object by providing a solid-state based light source for emitting light, including one or more light source elements for generating light, a first sensor for receiving light emitted by the light source elements and ambient light and for generating a first sensor signal representing the received light, a second sensor for only receiving ambient light and for generating a second sensor signal representing the received ambient light, and a control unit for receiving the first and the second sensor signals and for generating control signals for controlling the light source elements based on the difference between the first and the second sensor signals to compensate for the influence of ambient light. According to the present invention, a second sensor with corresponding wiring is provided together with the control unit that is adjusted accordingly. Identical sensors can be employed. The first sensor is positioned to receive the light emitted from the light source elements and the ambient light and may comprise means for ensuring that the light emitted from these two light sources is capable of reaching the sensor. The second sensor comprises means and is positioned to prevent the light emitted by the light source elements from reaching the sensor.

An advantageous embodiment of the present invention comprises a third sensor protected from light for generating a third sensor signal representing darkness for use as a reference, wherein the control unit further receives the third sensor signal for generating control signals for controlling the light source elements taking into account the third sensor signal. The third signal constitutes a reference signal defining a base line such that the sensor signals generated by the first and second sensors can be evaluated in a more precise way. The underlying idea is that evaluations based on differences are more precise than those based on absolute values, since external influences, e.g. temperature changes, are widely compensated for, since they almost equally affect the employed sensors.

A preferred embodiment of the present invention is provided with an input unit for inputting information concerning the desired properties of the light emitted by the solid-state based light source and the control unit for receiving the information from the input unit and for generating control signals for controlling the light source elements according to the desired properties. A user has the possibility to define the properties of the light emitted by the solid-state based light source. Such properties could be the color or the brightness of the light to be emitted.

Advantageously, a further embodiment includes directing means for selectively directing the ambient light together with the light generated by the light source elements to the first sensor and the ambient light alone to the second sensor. These means ensure that the two sensors are provided with the appropriate light such that the influence of the ambient light can correctly be compensated for. An example of a directing means may be light guides directing light received at a defined place to the first and/or second sensor.

A preferred version of the present invention comprises a diffuser at least partially located above the light source elements and the sensors for improving the quality of the sensor signals generated by the first and second sensors by directing at least parts of the light generated by the light source elements to the first sensor and by demodulating and uniformly directing the ambient light to the first and the second sensors. The diffuser mixes the light that reaches the sensors. Furthermore, the light reaches the sensors in a uniform way. Accordingly, the sensors receive a more precisely defined light which enables the sensors to generate enhanced and improved sensor signals.

Advantageously, yet another embodiment of the present invention possesses a filter construction comprising a first diffuser for collecting ambient light and the light generated by the light source elements and a second diffuser for only collecting ambient light, and a mounting unit for integrally mounting the first and the second sensors and the filter construction, wherein the first diffuser directs the collected light to the first sensor and the second diffuser directs the collected light to the second sensor. The mounting unit facilitates the assembly of the components, since they can separately be pre-assembled in the mounting unit before being inserted as a whole into the solid-state based light source. This is advantageous since the available space inside the solid-state based light source is often very restricted, which renders the assembly more complicated. The complexity of the assembly increases with the number of individual parts that have to be mounted. Thus, pre-assembly of the sensors and all parts required for the filter construction and the power supply in an environment without substantial space-limitations, i.e. outside the solid-state based light source, clearly facilitates the manufacturing of the solid-state based light source, leading to a more economical product.

A preferred embodiment is distinguished in that the first diffuser protrudes over the mounting unit and has at least one first sidewall and a first end-surface with a first outwardly facing layer and a second inwardly facing layer, wherein the parts of the sidewall protruding over the mounting unit and the first outwardly facing layer are transparent and the second inwardly facing layer at least partially directs the light having penetrated the sidewalls to the first sensor, and the second diffuser has at least one transparent second sidewall and a second transparent end-surface, the end-surface aligning with the mounting unit, said mounting unit having delimiting walls which are non-transparent. This arrangement ensures that the first sensor is impinged with ambient light and light emitted by the light source elements of the solid-state based light source, whereas the second sensor is only loaded with ambient light.

The invention is advantageously developed further in that the first and the second diffuser equally protrude over the mounting unit. This leads to a symmetric and uniform arrangement which has the advantage that the first and the second diffuser can be of the same dimensions, differing only in their surface properties, i.e. transparent, non-transparent etc. Hence, the manufacture is to a large extent identical, which leads to reduced costs. Furthermore, the symmetrical arrangement renders the emitted light more homogeneous, thus improving the light quality.

Another preferred design of the present invention is characterised in that the first and second sensors and the first and second diffusers of the filter construction are concentrically arranged around each other, i.e. the second sensor is surrounded by the first sensor, the second diffusor is surrounded by the first diffusor, the first sidewall is transparent, and the second sidewall is non-transparent. This arrangement further increases the degree of symmetry; the advantages discussed above equally apply to this design but to a larger extent.

In a beneficial embodiment, the delimiting walls are transparent and/or the first and the second diffusors protrude over the mounting unit. Thereby it is ensured that the light which is emitted from an angle below the upper end of the filter construction can enter into the filter construction. This increases the degree of freedom for the positioning of the mounting unit. It is possible to position the mounting unit considerably above the light source elements without having restrictions as to the functionality of the sensors.

In a favourable embodiment of the present invention, the first and second diffusers are funnel-shaped for only receiving the ambient light emitted within a predetermined angle range. By choosing the opening angle of the funnel, light emitted at a given angle can at least partially be prevented from entering the sensors and will not, or to a minor degree, be considered in the control of the emitted light. Subsequently, light emitted at another angle can be considered to a larger degree. In case the ambient light is always emitted from the same light source that is fixed in its position, this light can selectively be considered in order to generate specific mixing effects.

In a preferred stage of development of the present invention, the mounting unit further comprises a common cathode for facilitating the wiring of the first and the second sensors. This feature also serves for rendering the manufacture less complex and less expensive.

A preferred embodiment contains a reflector encompassing the light source elements and the sensors for homogenising the radiation direction of at least part of the light generated by the light source elements. The emitted light at least partially leaves the solid-state based light source in a defined direction, forming a beam of light. The bundled light has a higher brightness and can be used to illuminate a specific area, e.g. a picture in a room or a part of a building, e.g. the top of a tower.

A further aspect of the present invention relates to a circuitry for compensating for ambient light, comprising at least one first input channel for inputting the first sensor signals, at least one second input channel for inputting the second sensor signals, at least one signal processing unit for calculating the difference between the first and the second sensor signals for compensating for the ambient light and for generating a corresponding control signal, at least one output channel for outputting the control signal.

A beneficial development of the circuitry comprises a first transformation unit for transforming the first sensor signals into first tristimulus signals, a second transformation unit for transforming the second sensor signals into second tristimulus signals, a further signal processing unit for calculating the difference between the first and the second tristimulus signals for compensating for the ambient light and for generating a corresponding control tristimulus signal. The transformation units increase the amount of signal formats that can be used in order to control the light emitted by the solid-state based light source. Thus, the transformation units can generate signals that are easier or faster to process than others and the control unit can be simplified or can operate at a higher frequency. The control of the light source elements can be accelerated and the emitted light better adjusted e.g. to changes desired by the user.

Yet another aspect of the present invention relates to a method of emitting light by means of a solid-state based light source, comprising the steps of
  generating light by means of one or more light source elements,
  receiving the light generated by the light source elements and the ambient light using a first sensor,
  generating a first sensor signal using the first sensor,
  receiving the ambient light using a second sensor,
  generating a second sensor signal using the second sensor,
  receiving the first and the second sensor signals by means of a control unit,
  subtracting the second sensor signal from the first sensor signal to compensate for the influence of the ambient light by means of the control unit,
  generating signals to control the light emitted by the solid-state based light source by means of the control unit.

DETAILED DESCRIPTION OF EMBODIMENTS

Figure 1:
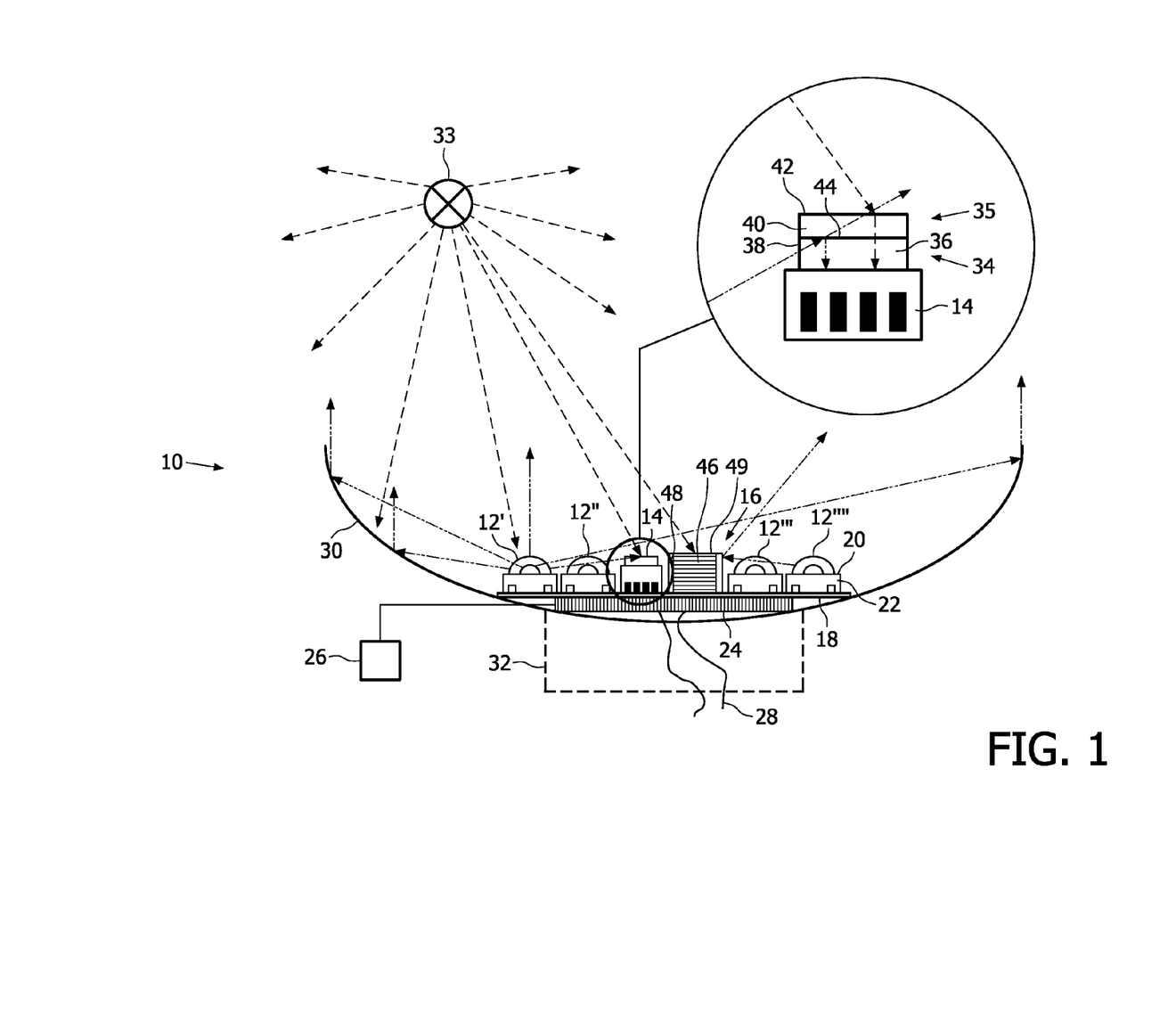
FIG. 1 shows a side view of a first embodiment of a solid-state based light source according to the present invention.

In FIG. 1 a solid-state based light source 10 according to a first embodiment of the present invention is illustrated. The light source 10 in the presented embodiment comprises four light source elements 12' to 12'''', a first sensor 14 and a second sensor 16. These members are all mounted on a printed circuit board 18. The light source elements 12 are fixed on upper surfaces 20 of sockets 22. A control unit 24 is located underneath the printed circuit board 18. The control unit 24 can be provided with additional electronic devices, which are not depicted in the drawings. The control unit 24 can be connected to an input unit 26 that enables a user to specify the desired properties of the light to be emitted from the light source 10. A power supply 28 guarantees that the power demanding units of the light source 10 are provided with power. Further, the light source 10 comprises a reflector 30 for homogenizing and bundling the emitted light and for directing the emitted light into a preferred direction. The light source 10 is mounted on a fixture socket 32 by which it can also be fixed to any suitable support. An ambient light source 33 generates and emits ambient light. To enable proper differentiation, the light emitted by the ambient light source is symbolized by arrows with dashed lines, whereas light emitted by the light source elements 12 is indicated by arrows with dash-dotted lines.

The working principle of the light source 10 is as follows. A user can specify the desired properties of the light to be emitted by the light source 10 by means of the input unit 26. The properties can be specified by choosing certain values e.g. for the brightness or the color of the light to be emitted. Alternatively, the properties of the light to be emitted are preset by the manufacturer. In this case the input unit 26 can be omitted and the user does not have the possibility to choose and change the properties of the light emitted by the light source 10. By supplying power, the light source elements 12 start generating light. The light source elements 12 can be realized as LEDs or other suitable devices. To generate light of a desired color, the four light source elements 12' to 12'''' can each be of individual colors, e.g. red, green, blue and amber. A different number of light source elements 12 as well as other combinations are possible.

In the illustrated embodiment it is assumed that all the light source elements 12 are mounted at the same height and can only emit light within a sector delimited by a horizontal plane defined by the upper surfaces 20 of the sockets 22 of the light source elements 12, i.e. the sector has an opening angle of 180°. In case the light source elements 12 are not mounted at the same height, the plane is defined by the upper surface 20 of the highest socket 22. Provided the light source 10 is not operated in a completely dark environment, the ambient light source 33, e.g. the sun or an artificial light source, is present and emits ambient light. The ambient light enters the light source 10 and reaches the first and the second sensors 14 and 16. The sensors 14 and 16 can be adapted to characterize the received light e.g. in terms of the color or the brightness. Sensors that characterize the light in a different manner can also be employed. The sensors 14 and 16 are equipped with directing means 34 that selectively direct the ambient light and the light generated by the light source elements 12 to the first sensor 14 and the ambient light alone to the second sensor 16.

In the embodiment illustrated in FIG. 1, the directing means 34 of the first sensor 14 are part of a filter construction 35 consisting of a first diffuser 36 that collects the ambient light as well as the light generated by the light source elements 12 and homogenizes the collected light and directs it to the first sensor 14 such that it reaches the first sensor 14 perpendicularly to its surface (see enlarged view). The first diffuser 36 has a first sidewall 38 that is transparent and a first end-surface 40. This first end-surface 40 has a first outwardly facing layer 42 and a second inwardly facing layer 44. The first layer 42 is transparent, so that all light reaching the first layer 42 can penetrate into the first diffuser 36. The second layer 44 is semi-transparent, which means that all light impinging on the second layer 44 from outside, i.e. in the present case the light that has previously penetrated the first layer 42, can also penetrate the second layer 44. Light impinging on the second layer 44 from inside, i.e. the light that has penetrated the sidewall 38, is at least partially reflected and the reflected part is directed to the first sensor 14. The first diffuser 36 makes sure that the first sensor 14 is loaded with ambient light together with light emitted by means of the light source elements 12.

Alternatively, the first diffuser 36 can be omitted when the entire first sensor 14 is positioned below the sockets 22 of the light source elements 12 and when the light source elements 12 are capable of emitting light beyond the horizontal plane, i.e. within a sector of an opening angle greater than 180°. In this case, ambient light as well as the light generated by the light source elements 12 would impinge on the first sensor 14.

The directing means 34 of the second sensor 16 is realized as a second diffuser 46 that collects the ambient light only and directs it to the surface of the second sensor 16. The second diffuser 46 has a second sidewall 48 that exceeds the upper surfaces 20 of the sockets 22 and is non-transparent to prevent light generated from the light source elements 12 from reaching the second sensor 16. The second diffuser has a transparent second end-surface 49 through which the ambient light can penetrate. The second sidewall 48 has a reflecting surface to prevent the light generated from the light source elements 12 from being absorbed. Instead, it is reflected and can contribute to the light emitted by the light source 10 (cf. ray of light emitted from the light source element 12"").

When the light reaches the surface of the sensors, a corresponding sensor signal is generated. The first sensor 14 generates a first sensor signal S1, which represents the ambient light and the light emitted by the light source elements 12. The second sensor 16 generates a second sensor signal S2 that represents the ambient light only. The first and the second sensor signals S1 and S2 are then transmitted to the control unit 24 that generates a control signal SC based on the difference between the first and the second sensor 16 signals. In case the input unit 26 is connected to the control unit 24, the properties specified by the user are also considered by the control unit 24 when generating the control signal Sc (cf. FIG. 2).

Figure 2:
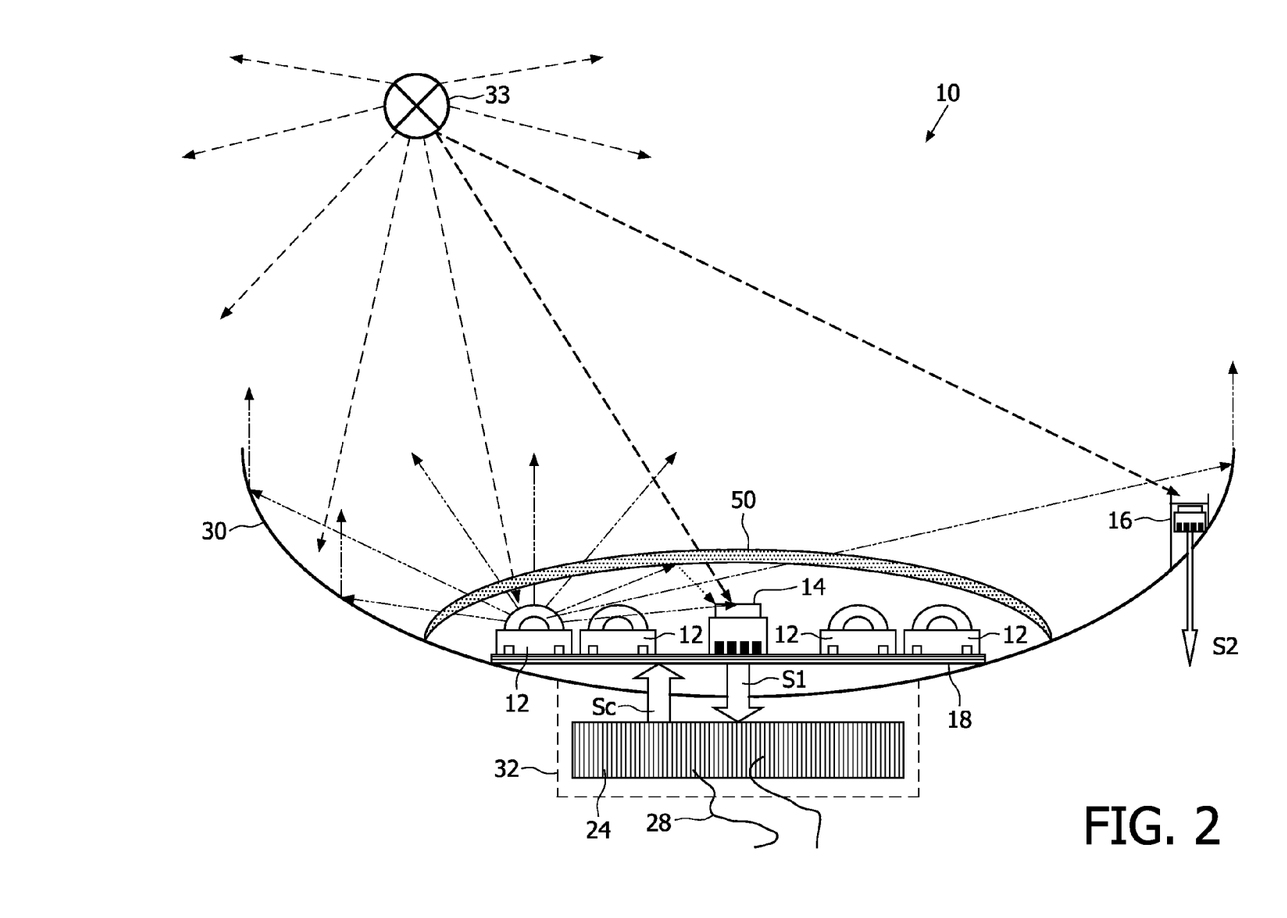
FIG. 2 is a side view of a second embodiment of a solid-state based light source according to the present invention.

FIG. 2 shows another embodiment of the present invention. Here, a main diffuser 50 is located above the light source elements 12 and the first sensor 14. The working principle of the main diffuser 50 is the same as described for the first diffuser 36, however, its construction is slightly different. The main diffuser 50 only consists of a convexly curved end-surface without sidewalls. The essential purpose of the main diffuser 50 is to improve the quality of the sensor signals. Since light emitted by the light source elements 12 is partly reflected by the main diffuser 50 (in the same way as described for the first diffuser 36, see above), the intensity of the light is increased and the sensors receive a more intense light, resulting in a more defined and stronger sensor signal. Since the main diffuser 50 is located above the light source elements 12 and the sensors, discrimination between ambient light and light emitted by the light source elements 12 is not possible anymore since the light below the main diffuser 50 consists of contributions from both light sources 12 and 33. Therefore, the second sensor 16 that collects the ambient light only is located outside the main diffuser 50, in the depicted case near the opening end of the reflector 30. As described above, the second sensor 16 is protected from light emitted by the light source elements 12 by non-transparent sidewalls that also serve as fixture for the second sensor 16 on the reflector 30. The second sensor signals S2 can be transmitted to the control unit 24 either by wires or wirelessly.

Figure 3:
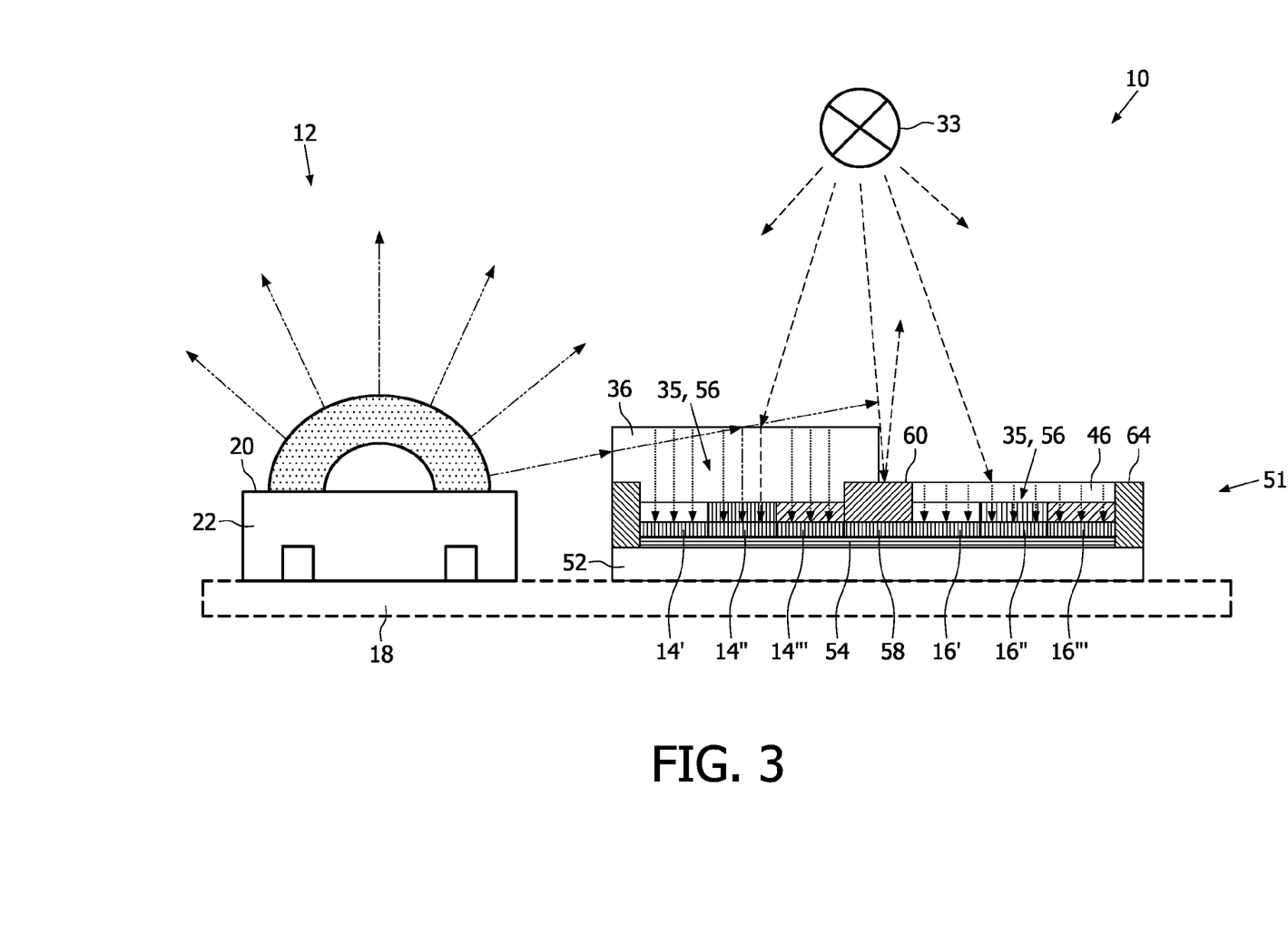
FIG. 3 is an enlarged side view of a third embodiment of a solid-state based light source according to the present invention.

FIG. 3 illustrates a third embodiment of the present invention. The first and the second sensors 14 and 16 are integrated into a mounting unit 51. The mounting unit 51 comprises a sensor substrate 52 to which a common cathode 54 is fixed. In the illustrated example of the solid-state based light source 10, the first and the second sensors 14 and 16 are subdivided into three sub-areas 14', 14" and 14'" as well as 16', 16" and 16'", respectively. The filter construction 35 comprises a color filter arrangement 56 positioned above each sub-area. The arrangement 56 enables to characterize the color of the received light by measuring the contribution of three colors, e.g. red, green and blue. However, different numbers and colors are conceivable. The filter arrangement comprises different filters through which only the contribution of one specific color of the light impinging on the filter can penetrate. Moreover, a third sensor 58 is provided that is protected from light, in this case by a reflecting layer 60. The third sensor 58 generates a third sensor signal S3 that represents darkness and serves as a reference signal. In case the sensors are adapted to measure the color of the received light (as is the case in the illustrated example), the third sensor signal S3 can be used for defining the color black as well as one end of the color spectrum of visible light. In case the brightness of the received light is measured, the third sensor signal S3 can be used for defining the minimum brightness. Hence, the color and the brightness of the received light can be evaluated based on the difference of the sensor signals, which leads to more precise results than evaluating the color and the brightness based on absolute sensor signals.

Further, the mounting unit 51 comprises the first and second diffusers 36 and 46 and delimiting walls 64. The second diffuser 46 aligns with the delimiting walls 64, whereas the first diffuser 36 protrudes over the mounting unit 51. The protruding first diffuser 36 enables the collection of the light emitted by the light source elements 12 in the manner described above. In order to prevent the light emitted from the light source elements 12 from reaching the second sensor 16, the delimiting walls 64 extend the upper surfaces 20 of the sockets 22 of the light source elements 12.

Alternatively, it is possible that the first and the second diffuser 36, 46 equally protrude over the mounting unit 51. In this case (not demonstrated) the second sidewall 48 of the second diffuser 46 is non-transparent to prevent the light emitted by the light source elements 12 from entering the second sensor 16.

Figure 4:
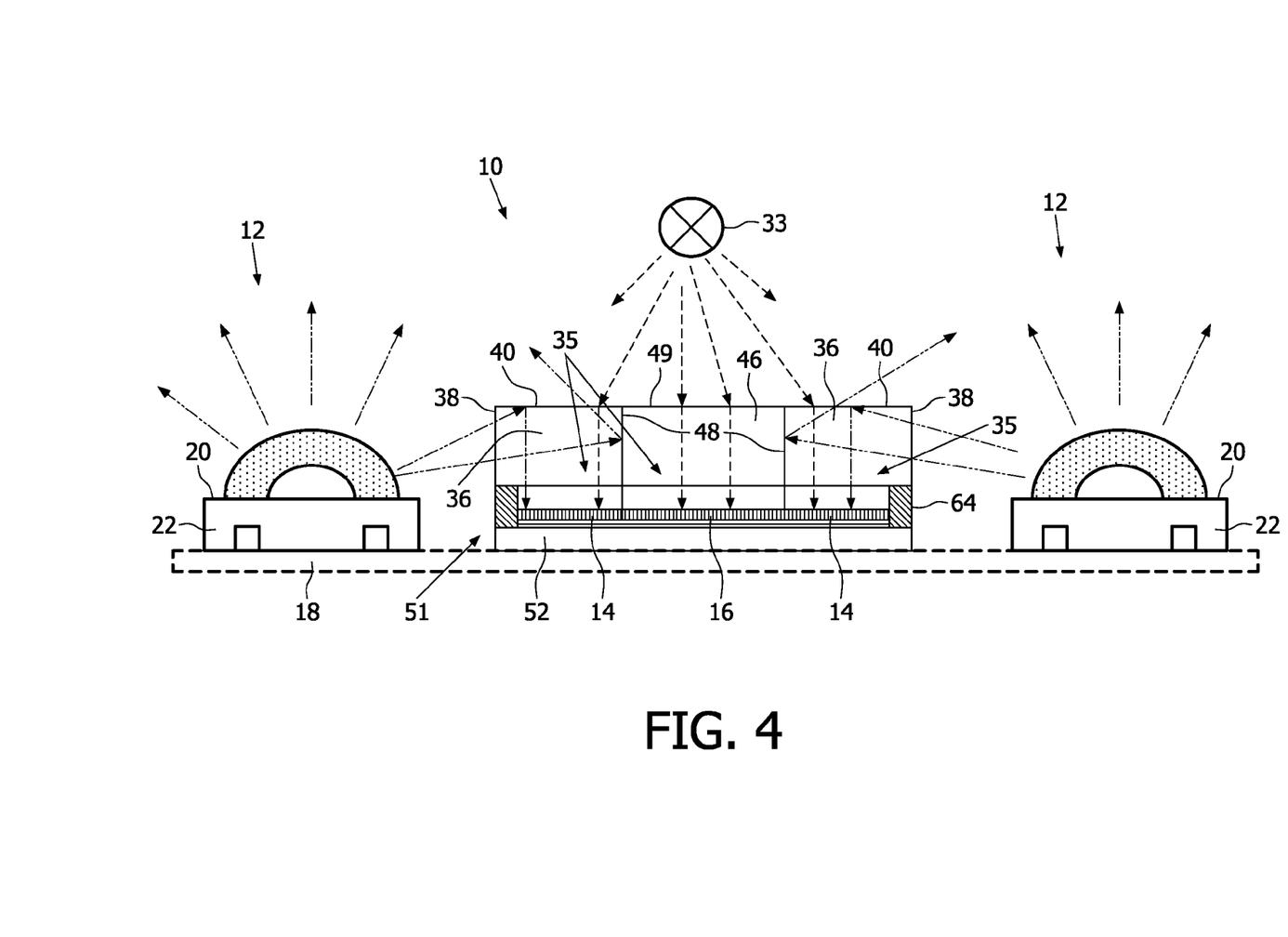
FIG. 4 is an enlarged side view of a third embodiment of a solid-state based light source according to the present invention.

In FIG. 4 a fourth embodiment of the solid-state based light source 10 is illustrated. In this embodiment the second sensor 16 and the second diffuser 46 are fully encompassed by the first sensor 14 and the first diffuser 36. The first and second end faces 40 and 49 of the diffusers 36 and 46 protrude over the horizontal plane. In the presented embodiment, the sensors 14, 16 and the diffusers 36, 46 have a circular shape, but other shapes such as triangular, rectangular or hexagonal are also possible. The sensors 14, 16 can be subdivided into two or more sub-areas as described above and illustrated in FIG. 3. The first sidewall 38 of the first diffuser 36 is transparent and light emitted from the light source elements 12 can penetrate so as to be directed towards the first sensor 14 by means of the first end-surface 40, as described before. The second sidewall 48 is non-transparent, thereby preventing light from entering into the second diffuser 46. In the embodiment illustrated in FIG. 4 the second sidewall 48 is reflective, so that light emitted from the light source elements 12 is reflected and contributes to the light emitted by the solid-state based light source 10.

Due to the non-transparency of the second sidewall 48, no light generated by the light source elements 12 can enter the second diffuser 46. Therefore, various constructions of the second end-surface of the second diffuser 46 can be chosen. The only constraint is that it is transparent to ambient light. For the sake of simplicity it could be advantageous that the construction of the second end-surface 49 and the first end-surface 40 are equal. Alternatively, the second end-surface 49 can be fully transparent. Yet another possibility would be that the first and the second sidewalls 38 and 48 are transparent, the first end-surface 40 of the first diffuser 36 is constructed as described above and the second end-surface 49 is transparent. The light emitted from the light source elements 12 is directed to the first sensor 14 when it impinges on the first end-surface 40. The light that does not impinge on the first end-surface 40 but penetrates the first and the second sidewalls 38, 48 hits the second end-surface 49 and leaves the second diffuser 46. It is not deflected and the second sensor 16 does not receive the contribution of the light emitted by the light source elements 12.

In a further development, at least the second diffuser 46 is funnel-shaped and the sidewalls 38, 48 are non-transparent. The opening angle can be adjusted, e.g. by an adjusting device (not shown) controllable by means of the input unit 26. By adjusting the opening angle of the first diffuser 36, ambient light emitted from a certain angle can be attenuated or amplified. Thereby, special light effects can be realized, particularly when the properties of the ambient light are well known, i.e. its angle of incidence, color or brightness. Such a situation may be found in a closed room in which the ambient light is only produced by controllable ambient light sources, i.e. the sun and the daylight have no impact. Conceivably, the light sources generating the ambient light could be included in the control mechanism of the solid-state based light source 10, opening up new possibilities for the creation of light effects.

Figure 5:
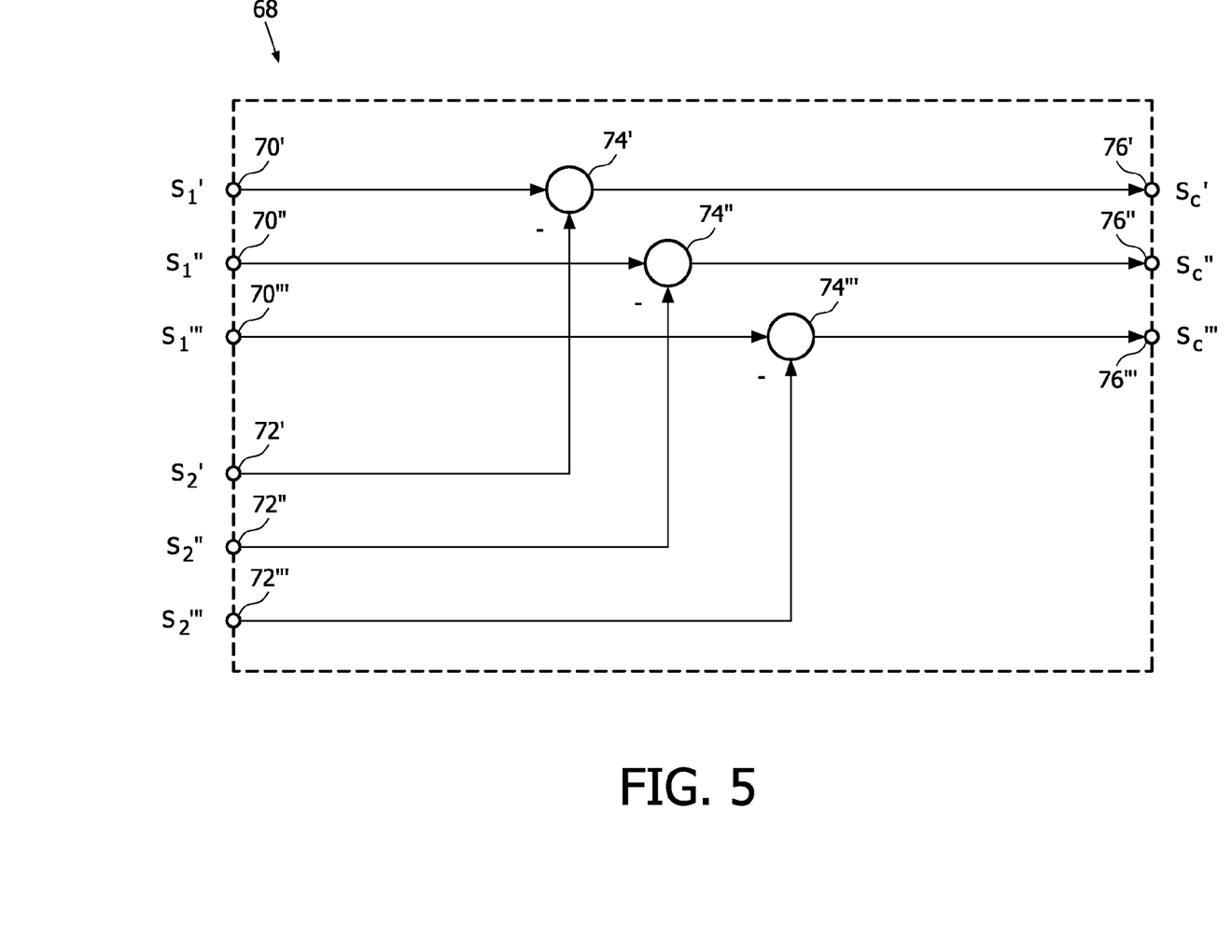
FIG. 5 is a diagram of a circuitry according to the present invention.

In FIG. 5 a circuitry 68 in accordance with the present invention is schematically illustrated. The circuitry 68 comprises at least one first input channel 70 for inputting the first sensor 14 signals, at least one second input channel 72 for inputting the second sensor signals S2, at least one signal processing unit 74 for generating the control signal SC, and at least one output channel 76 for outputting the control signal SC. The compensation for the ambient light contribution can be done as follows: by way of example, three channel RGB-color (red, green, blue) sensors have been chosen to realize the set-up. Different numbers of channels are also conceivable, e.g. a single channel (flux) sensor (if only brightness has to be controlled) or multi-channel sensors with more than three sensor signals, resulting in a higher resolution.

By subtracting the sensor signals S2 generated only by the ambient light from the sensor signals S1 including the ambient light and the light generated by the light source elements 12, the sensor signal contributions of the solid-state based light source 10 can be calculated. Mathematically this yields $$S_c{}^n = S_1{}^n - S_2{}^n$$

where:
n is the number of sensitive channels,
S1 is the sensor signal including the contribution of the ambient light and the light generated by the light source elements 12,
S2 is the sensor signal including the contribution of the ambient light only, and
Sc is the calculated sensor signal compensated for the contribution of the ambient light.

Figure 6:
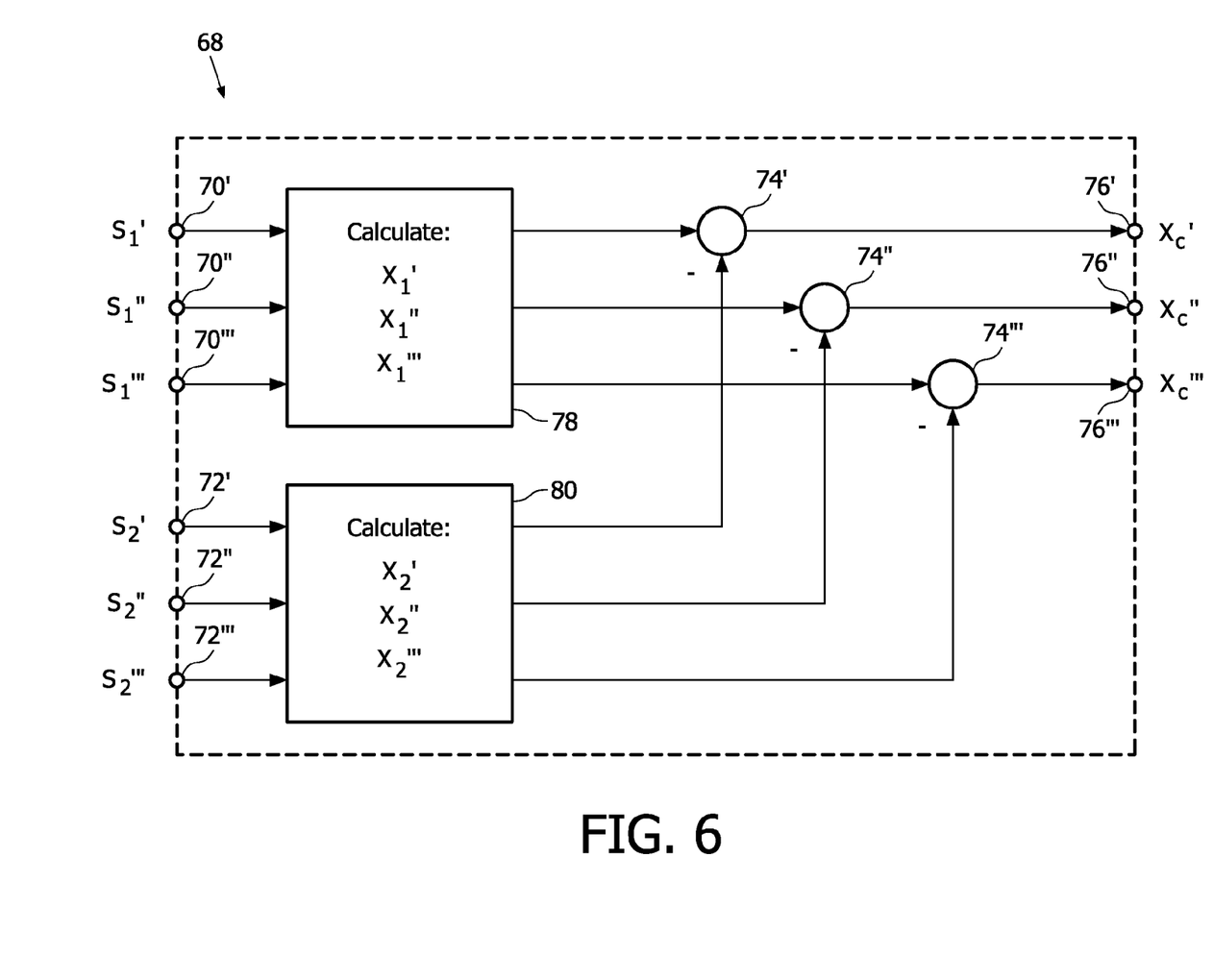
FIG. 6 is a diagram of a further circuitry according to the present invention.

A further way to generate an adequate result necessary to define the light output (color) of a light source 10 is principally shown in FIG. 6. In addition to the circuitry 68 displayed in FIG. 5, this circuitry 68 further comprises a first transformation unit 78 for transforming the first sensor signals S1 into first tristimulus signals and a second transformation unit 80 for transforming the second sensor signals S2 into second tristimulus signals. Basically the first and the second sensor signals S1 and S2 are converted into tristimulus values $X1n$ and $X2n$. From these values the tristimulus value $Xcn$ of the solid-state based light source 10 can be calculated. Finally, from this the color coordinates may be calculated.

Not included in FIGS. 5 and 6 are signal amplification stages as well as signal transformation routines, which may be necessary to convert absolute sensor readings into relative ones. Usually microcontroller or signal processing units may be used to perform the whole procedure, which also includes the use of calibration matrices as well as other necessary signal and/or mathematical operations and/or transformations and/or calculations to calculate the current color coordinates of the given light source 10. While the invention has been described with reference to specific embodiments, it will also be appreciated that various alterations and modifications will be apparent from the present disclosure and are considered to be within the scope of the idea underlying the present invention.

The invention claimed is:

1. Solid-state based light source for emitting light, comprising
   one or more light source elements for generating light,
   a first sensor for receiving light emitted by the light source elements and ambient light and for generating a first sensor signal representing the received light,
   a second sensor for only receiving ambient light and for generating a second sensor signal representing the received ambient light,
   a third sensor protected from light for generating a third sensor signal representing darkness for use as a reference;
   a control unit for receiving the first and the second sensor signals and for generating control signals for controlling the light source elements based on the difference between the first and the second sensor signals to compensate for the influence of the ambient light, wherein the control unit further receives the third sensor signal for generating control signals for controlling the light source elements taking into account the third sensor signal; and
   directing means for selectively directing the ambient light together with the light generated by the light source elements to the first sensor and the ambient light alone to the second sensor.

2. Solid-state based light source according to claim 1, further comprising an input unit for inputting information concerning the desired properties of the light emitted by the solid-state based light source and the control unit for receiving the information from the input unit and for generating control signals for controlling the light source elements according to the desired properties.

3. Solid-state based light source according to claim 1, further comprising a main diffuser at least partially located above the light source elements and the sensors for improving the quality of the sensor signals (S1) by directing at least part of the light generated by the light source elements to the first sensor and by demodulating and uniformly directing the ambient light to the first sensor.

4. Solid-state based light source according to claim 1, further comprising
a filter construction comprising a first diffuser for collecting the ambient light and the light generated by the light source elements and a second diffuser for only collecting the ambient light, and
a mounting unit for integrally mounting the first and the second sensors and the filter construction, wherein the first diffuser directs the collected light to the first sensor and the second diffuser directs the collected light to the second sensor.

5. Solid-state based light source according to claim 4, wherein
the first diffuser protrudes over the mounting unit and has at least one first sidewall and a first end-surface with a first outwardly facing layer and a second inwardly facing layer, wherein the parts of the sidewall protruding over the mounting unit and the first outwardly facing layer are transparent and the second inwardly facing layer at least partially directs the light having penetrated the sidewalls to the first sensor, and
the second diffuser has at least one transparent second sidewall and a second transparent end-surface, the end-surface aligning with the mounting unit, said mounting unit having delimiting walls which are non-transparent.

6. Solid-state based light source according to claim 5, wherein
the first and the second sensors and the first and second diffusers of the filter construction are concentrically arranged around each other,
the second sensor is surrounded by the first sensor,
the second diffusor is surrounded by the first diffusor,
the first sidewall is transparent, and
the second sidewall is non-transparent.

7. Solid-state based light source according to claim 6, wherein the first and the second diffusers are funnel-shaped for only receiving the ambient light emitted within a predetermined angle range.

8. Circuitry for compensating for ambient light, comprising
at least one first input channel for inputting first sensor signals representing combinations of generated and ambient lights,
at least one second input channel for inputting second sensor signals representing ambient lights,
at least one third input channel for inputting third sensor signals representing darkness for use as a reference,
a first transformation unit for transforming the first sensor signals into first tristimulus signals,
a second transformation unit for transforming the second sensor signals into second tristimulus signals,
a signal processing unit for calculating the difference between the first and the second tristimulus signals taking into account tristimulus signals corresponding to the third sensor signals, for compensating for the ambient light and for generating a corresponding control tristimulus signal, and
at least one output channel for outputting the control tristimulus signal.

9. Solid-state based light source for emitting light, comprising
one or more light source elements for generating light,
a first sensor for receiving light emitted by the light source elements and ambient light and for generating a first sensor signal representing the received light,
a second sensor for receiving ambient light and for generating a second sensor signal representing the received ambient light,
a control unit for receiving the first and the second sensor signals and for generating control signals for controlling the light source elements based on the difference between the first and the second sensor signals to compensate for the influence of the ambient light,
a filter construction comprising a first diffuser for collecting the ambient light and the light generated by the light source elements and a second diffuser for only collecting the ambient light;
a mounting unit for integrally mounting the first and the second sensors and the filter construction, wherein the first diffuser directs the collected light to the first sensor and the second diffuser directs the collected light to the second sensor; and
directing means for selectively directing the ambient light together with the light generated by the light source elements to the first sensor and the ambient light alone to the second sensor.

10. Solid-state based light source according to claim 9, wherein the first diffuser protrudes over the mounting unit and has at least one first sidewall and a first end-surface with a first outwardly facing layer and a second inwardly facing layer, wherein the parts of the sidewall protruding over the mounting unit and the first outwardly facing layer are transparent and the second inwardly facing layer at least partially directs the light having penetrated the sidewalls to the first sensor, and the second diffuser has at least one transparent second sidewall and a second transparent end-surface, the end-surface aligning with the mounting unit, said mounting unit having delimiting non-transparent walls.

11. Solid-state based light source according to claim 10, wherein
the first and the second sensors and the first and second diffusers of the filter construction are concentrically arranged around each other,
the second sensor is surrounded by the first sensor,
the second diffusor is surrounded by the first diffusor,
the first sidewall is transparent, and
the second sidewall is non-transparent.

12. Solid-state based light source according to claim 11, wherein the first and the second diffusers are funnel-shaped for only receiving the ambient light emitted within a predetermined angle range.

* * * * *